United States Patent
Rightmire

(10) Patent No.: US 7,637,525 B2
(45) Date of Patent: Dec. 29, 2009

(54) DRAWBAR HITCH ACCESSORY

(75) Inventor: Clark Rightmire, Benton, PA (US)

(73) Assignee: CBR Design and Machine, LLC, Montoursville, PA (US)

( * ) Notice: Subject to any disclaimer, the term of this patent is extended or adjusted under 35 U.S.C. 154(b) by 335 days.

(21) Appl. No.: 11/821,071

(22) Filed: Jun. 21, 2007

(65) Prior Publication Data
US 2008/0315554 A1      Dec. 25, 2008

(51) Int. Cl.
B60D 1/18      (2006.01)
(52) U.S. Cl. ...................... 280/480; 280/515
(58) Field of Classification Search ............... 280/480, 280/515
See application file for complete search history.

(56) References Cited

U.S. PATENT DOCUMENTS

| | | | | |
|---|---|---|---|---|
| 1,447,539 A | * | 3/1923 | Fultz | 172/679 |
| 1,935,987 A | * | 11/1933 | Paradise et al. | 280/413 |
| 1,980,046 A | * | 11/1934 | Frederiksen | 280/413 |
| 2,448,744 A | * | 9/1948 | Strader | 280/506 |
| 2,686,684 A | * | 8/1954 | Gudikunst et al. | 280/515 |
| 2,827,307 A | * | 3/1958 | Osborn | 280/416.3 |
| 3,528,684 A | * | 9/1970 | Cowgill | 280/456.1 |
| 3,740,079 A | * | 6/1973 | Skinner | 280/480 |
| 4,213,413 A | * | 7/1980 | Courtney | 114/253 |
| 4,280,713 A | * | 7/1981 | Bruhn | 280/416.1 |
| 4,563,981 A | * | 1/1986 | Kramer | 119/770 |
| 5,092,503 A | * | 3/1992 | Cocks | 224/519 |
| 5,267,748 A | * | 12/1993 | Curran | 280/415.1 |
| 5,458,389 A | * | 10/1995 | Young | 296/26.08 |
| 5,476,279 A | * | 12/1995 | Klemetsen | 280/415.1 |
| 5,566,965 A | * | 10/1996 | Applegate | 280/500 |
| 5,758,893 A | * | 6/1998 | Schultz | 280/477 |
| 5,918,896 A | * | 7/1999 | Jenkins, Jr. | 280/457 |
| 6,082,269 A | * | 7/2000 | Padberg | 108/44 |
| 6,279,939 B1 | * | 8/2001 | Austin | 280/457 |
| 6,604,658 B1 | * | 8/2003 | Young et al. | 224/521 |
| 2008/0315560 A1 | * | 12/2008 | Rasset et al. | 280/480 |

* cited by examiner

*Primary Examiner*—Lesley Morris
*Assistant Examiner*—Michael R Stabley
(74) *Attorney, Agent, or Firm*—Thomas R. Shaffer

(57) ABSTRACT

In its simplest form the present invention includes a drawbar hitch accessory having a hitch plate having a top surface, a bottom surface, a front edge, a rear edge, a left side edge and a right side edge. The top surface is generally rectangular in shape and is divided into six zones including a front right zone, a front center zone, a right center zone, a rear left zone, a rear center zone and a rear right zone. The rear left zone has a first hook opening extending from the top surface to the bottom surface and is generally centered in the rear left zone. The rear center zone has a second hook opening extending from the top surface to the bottom surface and is generally centered in said rear center zone and the rear right zone has a third hook opening which extends from the top surface to the bottom surface and is generally centered in the rear right zone. The front center zone has a first hitch plate ball mount opening extending from the top surface and is generally centered in the front center zone.

9 Claims, 8 Drawing Sheets

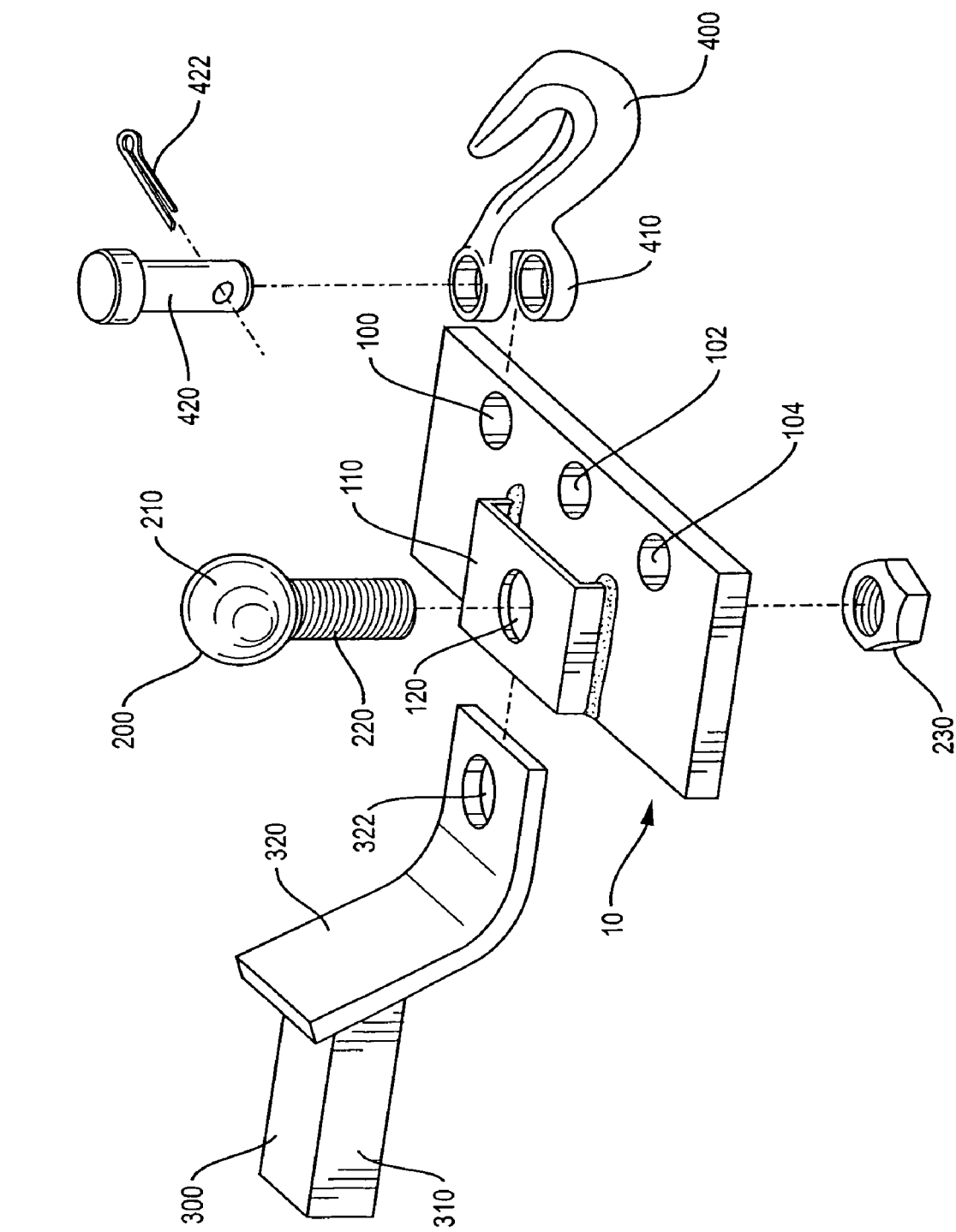

DRAWBAR HITCH ACCESSORY

BACKGROUND OF THE INVENTION

1. Field of the Invention

The present invention relates to a drawbar hitch accessory. More specifically it relates to a drawbar hitch accessory having a plate member having three hook attachment openings located in particular zones to allow for attachment of multiple chains, tow ropes, straps or cables. As used in this document the term "hook" is defined broadly and shall include hooks, devises and shackles.

2. Description of the Prior Art

A variety of prior art hitch mechanisms are known. Some of the earlier hitch devices are extremely complex, large and bulky. Examples of such devices can be seen in Paradise et al., U.S. Pat. No. 1,935,987; Frederiksen, U.S. Pat. No. 1,980,046; and Cowgill, U.S. Pat. No. 3,528,684.

Other hitch mechanisms have been proposed which provide more than one ball member. Examples of such devices are seen in Klemetsen, U.S. Pat. No. 5,476,279 and Bruhn, U.S. Pat. No. 4,280,713.

A variety of prior art hitch mechanisms are provided to convert a hitch mount into a device for a particular purpose. Examples of such devices include Curran, U.S. Pat. No. 5,267,748 (tool platforms); Cocks, U.S. Pat. No. 5,092,503 (carrier); Schultz, U.S. Pat. No. 5,758,893 (guiding member); Padberg, U.S. Pat. No. 6,082,269 (table and umbrella assembly); Young, U.S. Pat. No. 5,458,389 (bed extender); and Young et al., U.S. Pat. No. 6,604,658 (accessory carrier).

SUMMARY OF THE INVENTION

The present invention relates to a drawbar hitch accessory which facilitates the skidding or towing of large objects such as logs, stumps, treetops, stones. The invention allows the towing of multiple objects at the same time. It is now a common practice for a variety of vehicles to be provided with "towing packages". These packages consist of a ball-hitch to tow trailers of various types. These vehicles range from sedans, vans, station wagons, pickup trucks, farm tractors, bulldozers, related construction vehicles, "bobcats" and all terrain vehicles. The present invention provides a drawbar hitch accessory which allows conversion of a conventional ball-hitch or a drawbar connector into a device which will allow the towing of large objects and the like without interfering with the ball-hitch function.

In its simplest form the present invention includes a drawbar hitch accessory having a hitch plate having a top surface, a bottom surface, a front edge, a rear edge, a left side edge and a right side edge. The top surface is generally rectangular in shape and is divided into six zones including a front right zone, a front center zone, a right center zone, a rear left zone, a rear center zone and a rear right zone. The rear left zone has a first hook opening extending from the top surface to the bottom surface and is generally centered in the rear left zone. The rear center zone has a second hook opening extending from the top surface to the bottom surface and is generally centered in said rear center zone and the rear right zone has a third hook opening which extends from the top surface to the bottom surface and is generally centered in the rear right zone. The front center zone has a first hitch plate ball mount opening extending from the top surface and is generally centered in the front center zone.

Preferably each plate accessory further comprises a generally U-shaped connection member attached to the top surface in the front center zone. The connection member has a left vertical leg attached to said top surface, a right vertical leg attached to said top surface and a top member extending between the left leg and the right leg. The top member is parallel to and spaced above the top surface. The top member has a second hitch plate ball mount opening aligned vertically above the first hitch plate ball mount opening.

Preferably the left leg and the right leg each have a height between 2 inches and 4 inches.

Preferably the hitch ball is mounted through the first hitch plate ball mount opening and through said second hitch plate ball mount opening to allow use of said hitch ball with out the need for removal of the hitch plate.

Preferably the hitch ball is mounted through the first hitch plate ball mount opening to allow use of the hitch ball without the need for removal of the hitch plate.

In one embodiment of the invention, the rear right zone and the rear left zone of the hitch plate each have corners which are cutoff at an angle to allow mounting in limited space areas. Preferably said rear left zone and said rear right zone corners are cutoff at an angle which is preferably greater than 30 degrees and preferably 45 degrees.

A hook may be attached to at least one of the first opening, the second opening and the third hook opening. Preferably a hook is attached to each of the first hook opening, the second hook opening and the third hook opening.

Preferably the hitch plate is fabricated from a steel plate member having a thickness between ¼ inch and ½ inch.

Preferably the hitch plate is fabricated from a steel plate member having a length between 6 and 10 inches and a width between 3 and 6 inches, with said length being measured from a left side to a right side of the plate and the width being measured from a front to the rear of the plate.

BRIEF DESCRIPTION OF THE FIGURES

FIG. 1a is a perspective view in exploded form of the hitch plate ball mount, the hitch ball, the hitch plate and a hook member.

DETAILED DESCRIPTION OF THE PREFERRED EMBODIMENTS

Figure 1B:
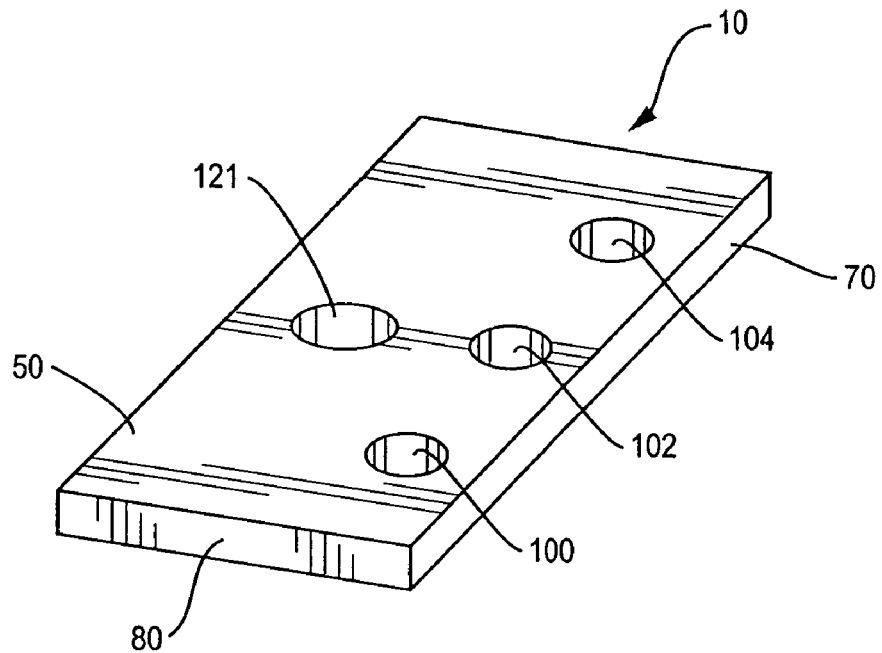
FIG. 1b is a perspective view of the bottom of the hitch plate.

Referring to the figures, the present invention provides a hitch plate accessory 10 which is adapted to be received by a standard prior art hitch ball mount 300 in a manner which allows for the attachment and continued unobstructed use of a hitch ball 200. As shown in FIG. 1a, the hitch ball mount 300 has a generally square shaft 110 which is adapted to be received by a standard hitch box receiver provided on any type of vehicle such as a truck, car, tractor, ATV or other vehicle. The hitch ball mount 300 has a hitch ball receiver plate 320 having an opening 322 therein.

A hitch ball 200 including a ball portion 210 and a threaded shaft 220 is adapted to be mounted through opening 322 of the hitch ball mount and secured by means of a nut 230. The hitch ball shaft 220 also passes through opening 120 of a U-shaped connection member of the hitch plate 10 and through opening 121 in the hitch plate 10.

Figure 1C:
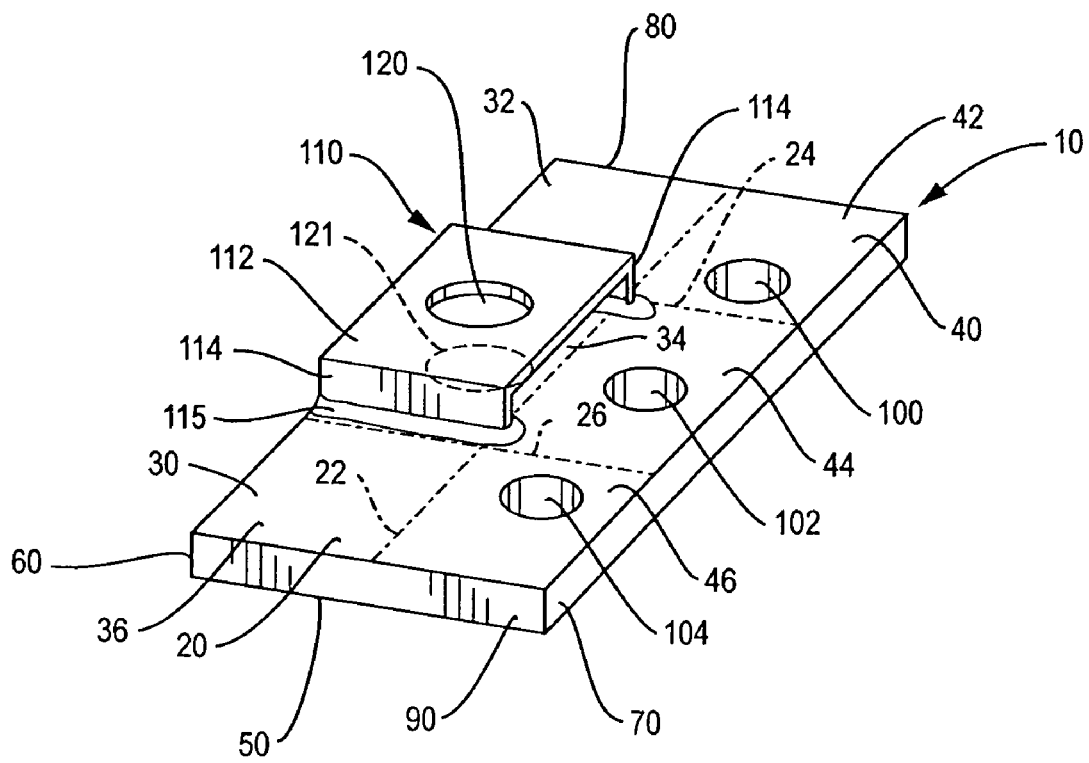
FIG. 1c is a perspective view of the hitch plate of the present invention including a U-shaped connection member.

Referring specifically to FIG. 1c, the details of the hitch plate 10 will be described. Hitch plate 10 includes a top surface 20 including a front half 30 and a rear half 40 which are defined by a dividing line 22. The hitch plate 10 includes a bottom surface 50, a front edge 60, a rear edge, 70, a left side edge 80 and a right side edge 90. The top surface 20 is divided into six zones of equal area which are defined by line 22 which runs from the left side to the right side and by lines 24 and 26 which run from the front to the rear of the top plate. These lines define a front left portion 32, a front center portion 34, a front right portion 36, a left rear side portion 42, a rear center portion 44 and a right rear side portion 46. A first hook opening 100 preferably located in a central portion of the left rear side zone 42. A second hook opening 102 is preferably provided in a center of the center rear zone 44. A third hook opening is preferably provided in a center portion of the right rear zone 46.

A hitch plate ball mount opening 110 is provided in a central portion of the front center zone 34.

Preferably, although not required, a U-shaped connection member 110 is provided over at least a portion of the front center zone 34. The U-Shaped connection 110 includes a left and right leg member, 114, 114 and a top member 112. The top member 112 has a second hitch plate ball mount opening 120 which is preferably aligned above the hitch ball mount opening 121.

Figure 2:
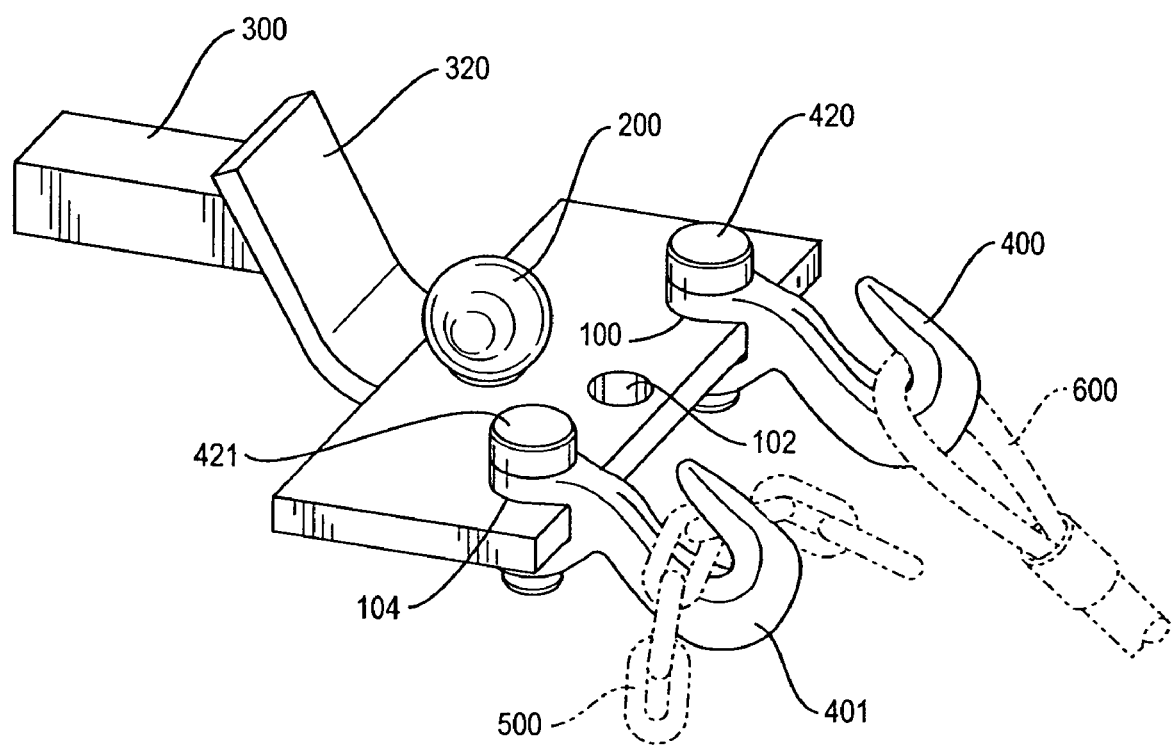
FIG. 2 is a perspective view in assembled form of a hitch ball mount, a hitch ball, a hitch plate, two hooks, one hook attached to a chain and a second hook attached to a cable.
Figure 6:
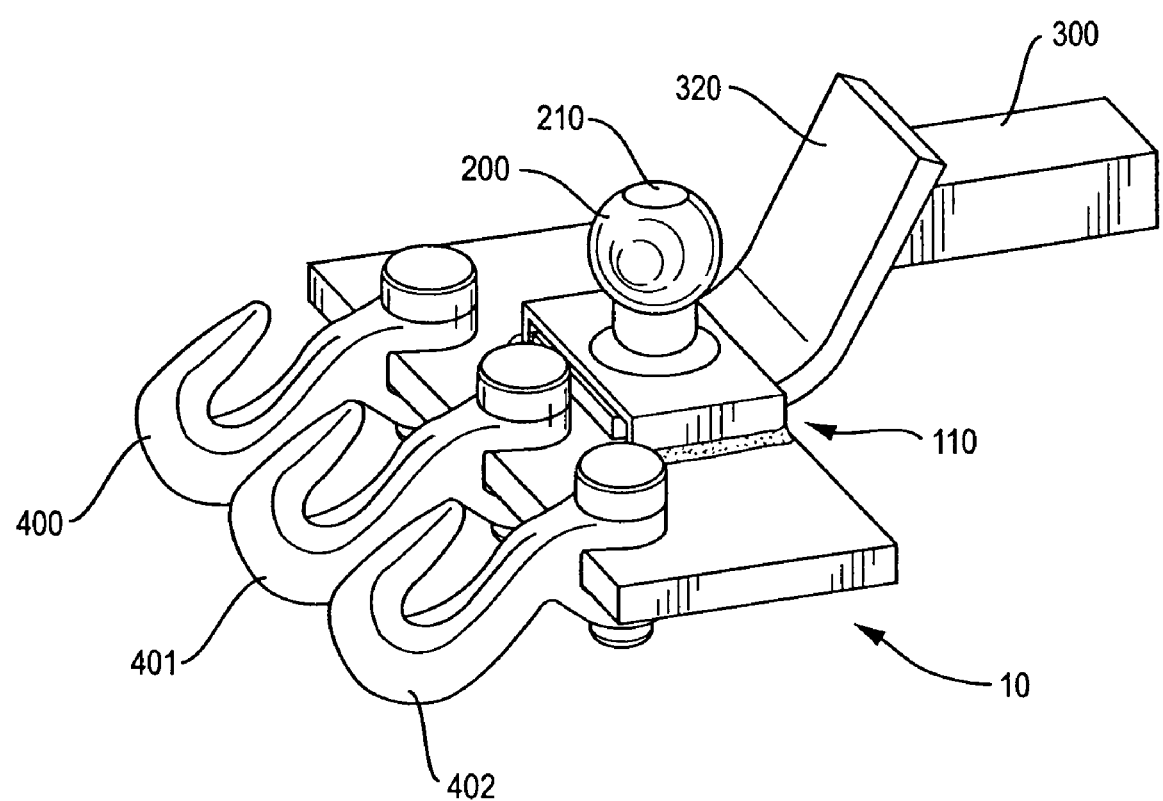
FIG. 6 is a perspective view of each the hitch plate accessory of the present invention as attached to a hitch ball mount in fully assembled form.

As can be seen from a comparison of FIGS. 2 and 6, the U-shaped member 10 can, in use, be oriented upwardly or downwardly.

Figure 3:
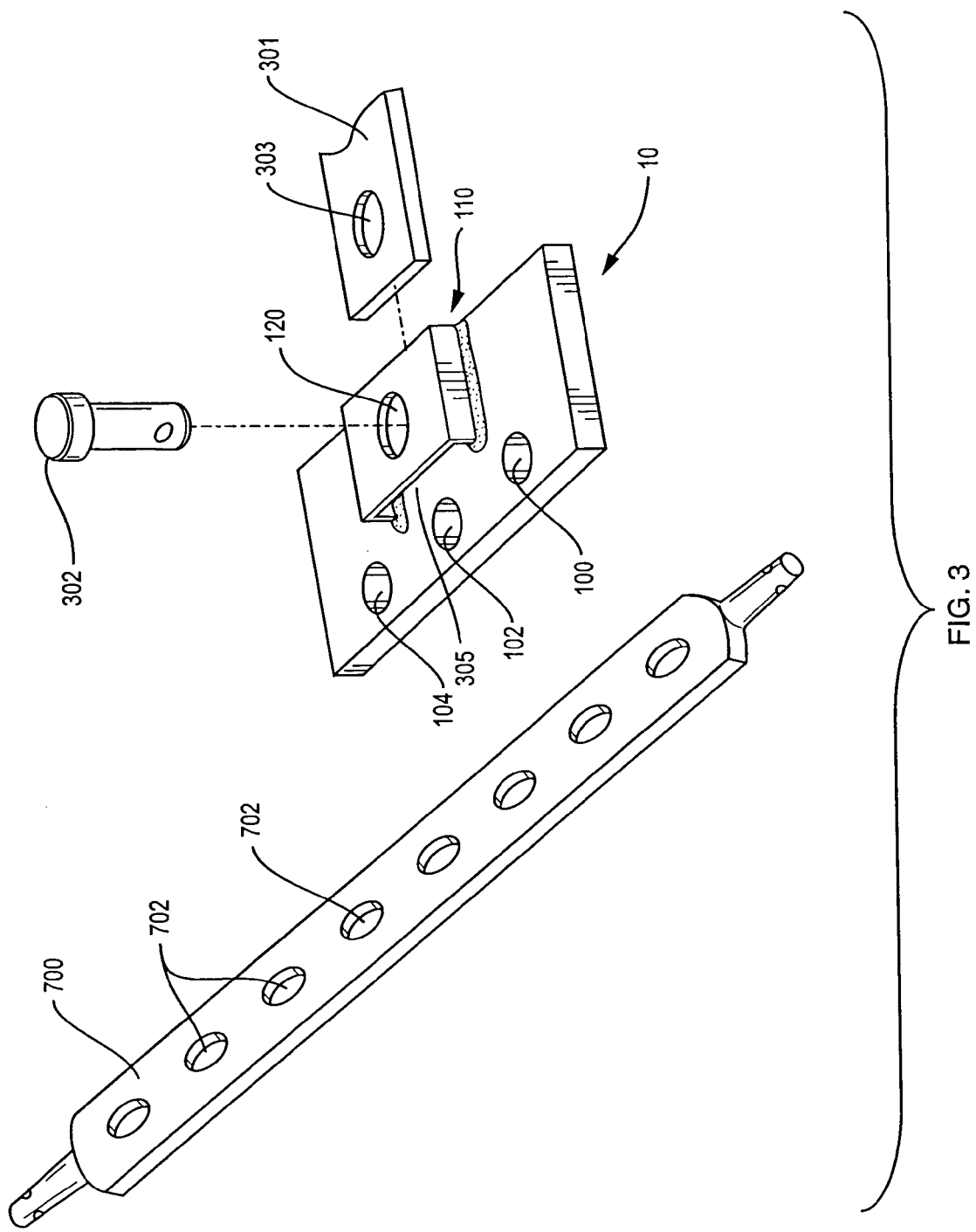
FIG. 3 is a perspective view in exploded form showing the provision of an additional drawbar which may be bolted to the hitch plate.

Referring to FIG. 3, in one embodiment of the invention it is contemplated that a long drawbar member 700 with a plurality of openings 702 therein may be mounted to the hitch plate 10. This would be accomplished by placing bolts through openings 100, 102 and 104 which would extend through three adjacent openings 702 of the drawbar 700. This device would allow more than three openings to which chains, cables, ropes or the like may be attached. As shown in FIG. 3, a tongue 301 having opening 303 therein may be inserted into a rectangular open 305 created by the U-shaped member 110. The tongue 301 is attached to the hitch plate 10 with pin 302 which will pass through openings 120, 303 and 121.

As shown in FIG. 2, a first hook 400 to which a cable 600 is attached is connected to the hitch plate through first hook opening 100. A pin 420 is utilized to attach the hook 400. Similarly a second hook 401, to which a chain is attached, is attached to the hitch plate accessory through opening 104 therein by pin 421. FIG. 6 shows similar arrangement with three hooks 400, 401 and 402 connected to the hitch plate accessory.

Figure 5:
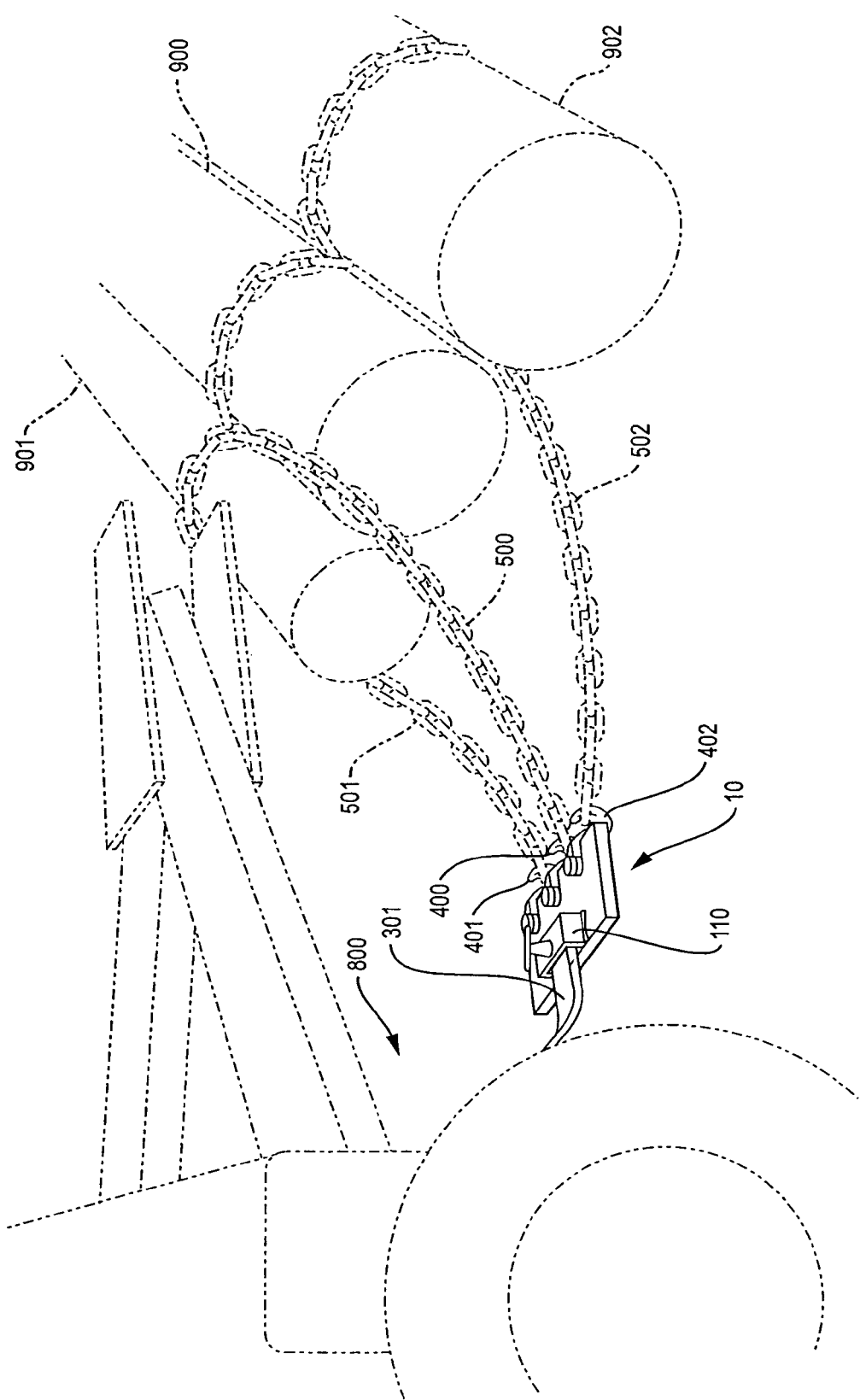
FIG. 5 is a perspective view showing the hitch plate accessory of the present invention attached to a tractor and pulling three logs.

FIG. 5 shows hitch plate accessory 10 in use with three hooks 400, 401 and 402 utilized to attach three chains 500, 501 and 502 respectively which are in turn wrapped around logs 900, 901 and 902. This device allows the skidding of multiple logs or other large objects at the same time. Applicant has discovered that the towing capacity of various vehicles far exceeds the actual load which typical towing or skidding situations typically provide. By providing a strong, compact and simple accessory device, applicant has been able to convert a standard ball mount into a device which can quickly and easily be utilized to pull, tow or drag multiple objects at the same time. This results in an enormous saving of time, energy and resources. This allows the vehicle to be utilized closer to its full towing capacity and allows the work to be completed in a fraction of the time.

Figure 4:
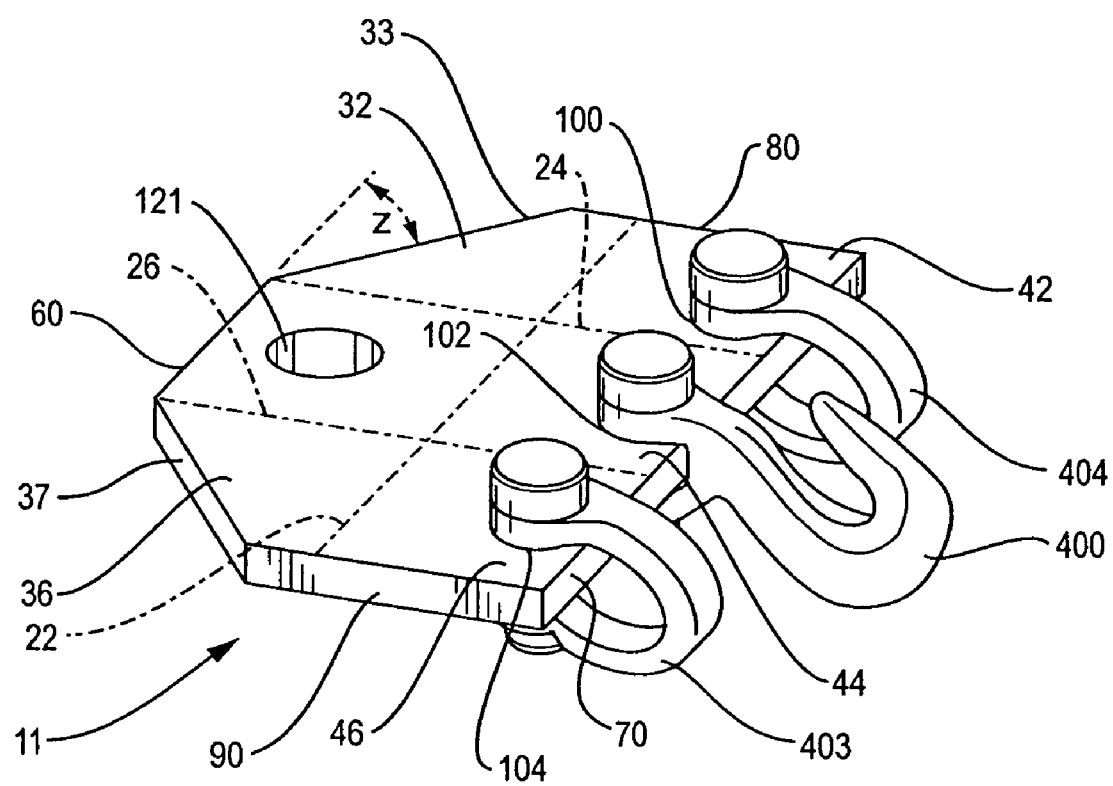
FIG. 4 is an alternative embodiment of the present invention having angled corners.

In one alternative embodiment of the present invention a smaller plate is provided which does not have a U-shaped connection member. Such embodiment is shown in FIG. 4 which is adapted for use on ATVs or other smaller vehicles where space requirement preclude the provision of a generally rectangular accessory plate. As shown in FIG. 4, a front left zone 32 is cutoff at 33 at an angle Z which is preferably greater than 30 degrees and preferably 45 degrees. Similarly the right front zone 36 is cutoff as shown at 37. These angled cuts allow the hitch plate 11 to be mounted directly to an ATV without interference from other components of the vehicle. The hitch plate 11 is shown having hooks (which may be in the form of a hook, clevis or shackle) 400, 403 and 404 attached through openings 100, 102 and 104.

Figure 7:
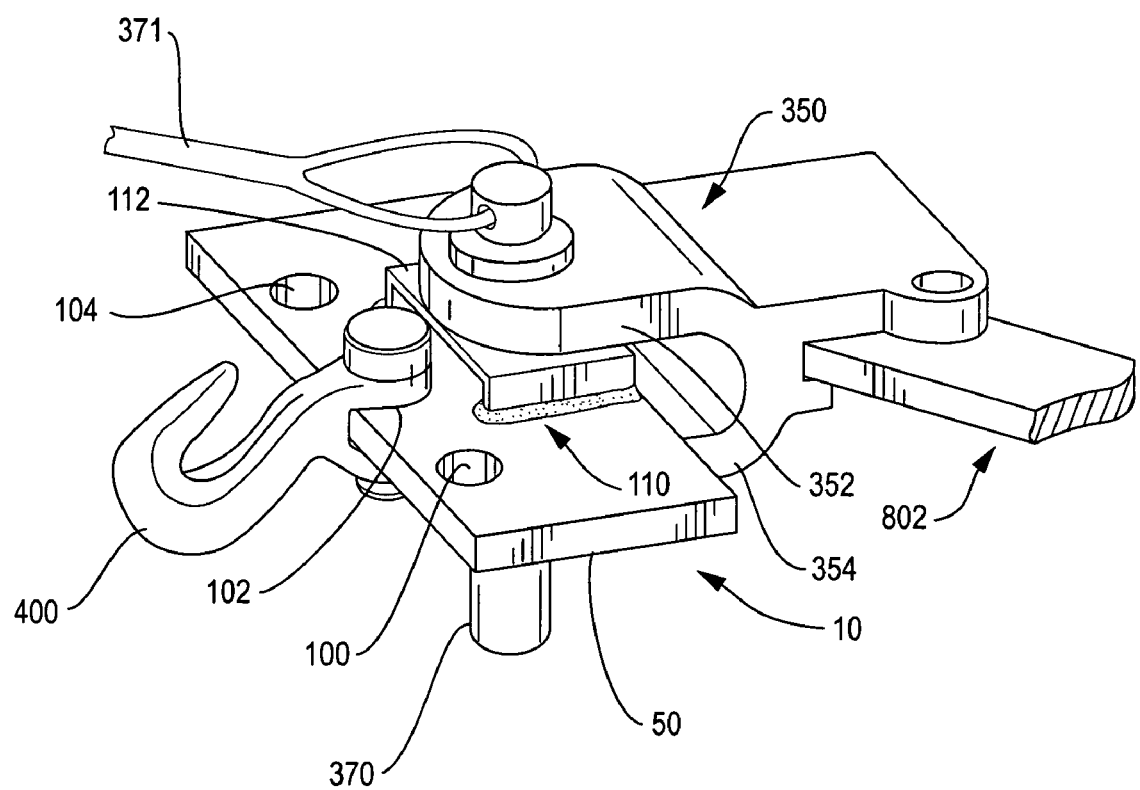
FIG. 7 is a perspective view of a hitch plate accessory of the present invention as mounted between a C-shaped clevis attached to a bulldozer.

As shown in FIG. 7, while the present invention is typically designed for a hitch ball mount plate to be mounted inside of a U-shaped connection member 11, there are situations where the plate member may be attached above the U-shaped connection member 110. As shown in FIG. 7 a generally C-shaped clevis 350 has a top member 352 which is juxtaposed above the top surface 112 of the U-shaped connection member 110 and further has a bottom member 354 which juxtaposed against the bottom surface 50 of the hitch plate 10. The C-shaped clevis 350 in this case is attached directly to a bulldozer 802. Because of the configuration of the accessory member of the present invention, the present invention provides great flexibility for use in connection with a variety of applications. The hitch plate 10 is secured to the clevis 350 by means of pin 370 and clip 371.

It is to be understood that while certain forms of the present invention have been illustrated and described herein, the present invention is not to be limited to the specific forms or arrangements of parts described and shown.

I claim:

1. A drawbar hitch accessory comprising a hitch plate having a top surface, a bottom surface, a front edge, a rear edge, a left side edge and a right side edge, said top surface being generally rectangular in shape and being divided into six zones including a front left zone, a front center zone, a right center zone, a rear left zone, a rear center zone and a rear right zone, said rear left zone having a first hook opening extending from said top surface to said bottom surface and being generally centered in said rear left zone, said rear center zone having a second hook opening extending from said top surface to said bottom surface and being generally centered in said rear center zone and said rear right zone having a third hook opening extending from said top surface to said bottom surface and being generally centered in said rear right zone, and said front center zone having a first hitch plate ball mount opening extending from said top surface to said bottom surface and being generally centered in said front center zone, said drawbar hitch accessory further comprising a generally U-shaped connection member attached to said top surface in said front center zone, said connection member having a vertical left leg member attached to said top surface, a vertical right leg member attached to said top surface and a top member extending between said left leg and said right leg, said top member being parallel to and spaced above said top surface, said top member having a second hitch plate ball mount opening aligned vertically above said first hitch plate ball mount opening.

2. A hitch bar accessory according to claim 1 wherein said left leg and said right leg each have a height between 2 inches and 4 inches.

3. A hitch bar accessory according to claim 1 wherein a hitch ball is mounted through the first hitch plate ball mount opening and through said second hitch plate ball mount opening to allow use of said hitch ball without the need for removal of said hitch plate.

4. A hitch bar accessory according to claim 1 wherein a hitch ball is mounted through the first hitch plate ball mount opening to allow use of said hitch ball without the need for removal of said hitch plate.

5. A hitch bar accessory according to claim 1 wherein said rear right zone and said rear left zone of said hitch plate each have corners which are cut off at an angle to allow mounting in limited space areas.

6. A hitch bar accessory according to claim 1 further comprising a hook attached to at least one of said first hook opening, said second hook opening and said third hook opening.

7. A hitch bar accessory according to claim 1 further comprising a hook attached to each of said first hook opening, said second hook opening and said third hook opening.

8. A hitch bar accessory according to claim 1 wherein said hitch plate is fabricated from a steel plate member having a thickness between $\frac{1}{4}$ inch and $\frac{1}{2}$ inch.

9. A hitch bar accessory according to claim 1 wherein said hitch plate is fabricated from a steel plate member having a length between 6 inches and 10 inches and having a width between 3 inches and 6 inches.

* * * * *